US008352566B2

(12) United States Patent
Cohen et al.

(10) Patent No.: US 8,352,566 B2
(45) Date of Patent: *Jan. 8, 2013

(54) SHARED GROUPS ROSTERING SYSTEM

(75) Inventors: Neil Cohen, Herndon, VA (US); John Panzer, Mountain View, CA (US); Catherine Tornabene, Palo Alto, CA (US); Muhammad Mohsin Hussain, Berkeley, CA (US); Todd Crowe, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,680

(22) Filed: Jan. 23, 2012

(65) Prior Publication Data

US 2012/0124154 A1  May 17, 2012

Related U.S. Application Data

(60) Continuation of application No. 12/246,191, filed on Oct. 6, 2008, now Pat. No. 8,103,729, which is a division of application No. 09/810,625, filed on Mar. 19, 2001, now abandoned.

(60) Provisional application No. 60/189,973, filed on Mar. 17, 2000.

(51) Int. Cl.
*G06F 15/16* (2006.01)
(52) U.S. Cl. ...................................................... 709/206
(58) Field of Classification Search .................... 709/206
See application file for complete search history.

(56) References Cited

U.S. PATENT DOCUMENTS

| 5,634,129 | A | 5/1997 | Dickenson |
| 5,774,673 | A | 6/1998 | Beuk |
| 5,974,446 | A | 10/1999 | Sonnenreich |
| 6,020,884 | A | 2/2000 | MacNaughton |
| 6,028,866 | A | 2/2000 | Engel |
| 6,073,109 | A | 6/2000 | Flores |
| 6,144,959 | A | 11/2000 | Anderson |
| 6,148,377 | A | 11/2000 | Carter |
| 6,212,548 | B1 | 4/2001 | DeSimone |
| 6,223,177 | B1 | 4/2001 | Tatham |
| 6,343,317 | B1 * | 1/2002 | Glorikian ...................... 709/218 |
| 6,351,777 | B1 | 2/2002 | Simonoff |
| 6,366,907 | B1 | 4/2002 | Fanning |
| 6,396,512 | B1 | 5/2002 | Nickerson |
| 6,404,438 | B1 | 6/2002 | Hatlelid |
| 6,449,344 | B1 | 9/2002 | Goldfinger |
| 6,457,062 | B1 | 9/2002 | Pivowar |
| 6,480,885 | B1 * | 11/2002 | Olivier ......................... 709/207 |
| 6,487,583 | B1 | 11/2002 | Harvey |

(Continued)

FOREIGN PATENT DOCUMENTS

WO   WO 00/10099   2/2000

(Continued)

*Primary Examiner* — Jerry Dennison
(74) *Attorney, Agent, or Firm* — Workman Nydegger

(57) ABSTRACT

Systems and techniques for sharing information among members of a group. Information about all current members of a group is stored. Instructions are received from at least one current member to invite at least one prospective member to join the group and the invitation to join the group is sent to the prospective member. In the event that an affirmative response is received, the prospective member is added to the current members of the group and automatically updated services are provided to current members of the group.

18 Claims, 8 Drawing Sheets

U.S. PATENT DOCUMENTS

| | | | |
|---|---|---|---|
| 6,487,584 B1 | 11/2002 | Bunney | |
| 6,499,053 B1 | 12/2002 | Marquette | |
| 6,519,629 B2 | 2/2003 | Harvey | |
| 6,611,822 B1 | 8/2003 | Beams | |
| 6,654,800 B1 | 11/2003 | Rieger, III | |
| 6,677,968 B1 * | 1/2004 | Appelman | 715/853 |
| 6,687,739 B2 | 2/2004 | Anupam | |
| 6,697,840 B1 | 2/2004 | Godefroid | |
| 6,701,343 B1 | 3/2004 | Kenyon | |
| 6,750,881 B1 * | 6/2004 | Appelman | 715/733 |
| 6,757,531 B1 | 6/2004 | Haaramo | |
| 6,807,562 B1 * | 10/2004 | Pennock et al. | 709/204 |
| 6,816,884 B1 | 11/2004 | Summers | |
| 6,931,419 B1 | 8/2005 | Lindquist | |
| 6,993,325 B1 | 1/2006 | Waesterlid | |
| 7,035,926 B1 | 4/2006 | Cohen | |
| 7,039,639 B2 * | 5/2006 | Brezin et al. | 1/1 |
| 7,054,918 B2 | 5/2006 | Polcyn | |
| 7,076,504 B1 | 7/2006 | Handel | |
| 7,082,407 B1 | 7/2006 | Bezos et al. | |
| 7,092,998 B2 | 8/2006 | Frietas | |
| 7,096,030 B2 * | 8/2006 | Huomo | 455/456.3 |
| 7,136,903 B1 | 11/2006 | Phillips | |
| 7,162,528 B1 | 1/2007 | Simonoff | |
| 7,237,002 B1 | 6/2007 | Estrada | |
| 7,240,093 B1 * | 7/2007 | Danieli et al. | 709/205 |
| 7,412,527 B2 * | 8/2008 | Pulver et al. | 709/229 |
| 7,454,709 B1 * | 11/2008 | Appelman | 715/733 |
| 7,539,942 B1 * | 5/2009 | Appelman | 715/733 |
| 7,680,796 B2 * | 3/2010 | Yeh et al. | 707/724 |
| 7,686,693 B2 * | 3/2010 | Danieli et al. | 463/42 |
| 2001/0013050 A1 * | 8/2001 | Shah | 709/202 |
| 2001/0018858 A1 * | 9/2001 | Dwek | 84/609 |
| 2002/0002586 A1 * | 1/2002 | Rafal et al. | 709/205 |
| 2002/0029224 A1 | 3/2002 | Carlsson | |
| 2002/0035605 A1 | 3/2002 | McDowell | |
| 2002/0046243 A1 | 4/2002 | Morris | |
| 2002/0059379 A1 * | 5/2002 | Harvey et al. | 709/205 |
| 2002/0154178 A1 | 10/2002 | Barnett | |
| 2002/0174050 A1 | 11/2002 | Eynard | |
| 2003/0014485 A1 | 1/2003 | Baratwala | |
| 2003/0028595 A1 | 2/2003 | Vogt | |
| 2003/0028597 A1 | 2/2003 | Salmi | |
| 2003/0042306 A1 | 3/2003 | Irwin | |
| 2003/0050976 A1 | 3/2003 | Block | |
| 2003/0060211 A1 | 3/2003 | Chern | |
| 2003/0064422 A1 | 4/2003 | McDevitt | |
| 2004/0030787 A1 | 2/2004 | Jandel | |
| 2004/0152517 A1 * | 8/2004 | Hardisty et al. | 463/42 |
| 2004/0162830 A1 * | 8/2004 | Shirwadkar et al. | 707/10 |
| 2004/0193722 A1 * | 9/2004 | Donovan | 709/230 |
| 2005/0055306 A1 * | 3/2005 | Miller et al. | 705/37 |
| 2005/0181878 A1 * | 8/2005 | Danieli et al. | 463/42 |
| 2005/0204063 A1 | 9/2005 | O'Brien | |
| 2005/0239550 A1 * | 10/2005 | Hardisty et al. | 463/42 |
| 2007/0112966 A1 * | 5/2007 | Eftis et al. | 709/227 |
| 2008/0147810 A1 * | 6/2008 | Kumar et al. | 709/206 |

FOREIGN PATENT DOCUMENTS

WO      WO 01/63423 A1      8/2001

* cited by examiner

SHARED GROUPS ROSTERING SYSTEM

CROSS REFERENCE TO RELATED APPLICATION

This application is a continuation of U.S. patent application Ser. No. 12/246,191, filed Oct. 6, 2008 now U.S. Pat. No. 8,103,729 (now allowed), which is a divisional of U.S. patent application Ser. No. 09/810,625, filed Mar. 19, 2001 (abandoned), which claims the benefit of U.S. Provisional Application No. 60/189,973, filed Mar. 17, 2000, all of which are expressly incorporated herein by reference to their entireties.

TECHNICAL FIELD

The present invention relates generally to transferring data between subscribers of a communications system and more particularly to sharing information among members of a group.

BACKGROUND

Online service providers are constantly offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations virtually take place in real time, instant messaging can provide immediate access to desired information. Instant messaging is becoming a preferred means of communicating among online subscribers.

Subscribers may at times encounter more complexity than they would like, which may lead to a frustrating experience online. Moreover, some subscribers may at times feel isolated in the online community. This is especially likely to occur for inexperienced subscribers. For example, it may be difficult to share information among members of a group such as, for example, a family. Tasks such as sharing an instant message buddy list, updating a shared address book, or updating a shared calendar may be time consuming, tedious, or intimidating to some subscribers.

SUMMARY

In one general aspect, information is shared among members of a group by storing information about all current members of the group, receiving instructions from a group member inviting a prospective member to join the group, sending an invitation to the prospective member, receiving a response from the prospective member, adding the prospective member to the group when the response is positive, and providing automatically updated services to current group members.

Implementations may include sending the invitation by an e-mail message, an instant message, or in an on-line chat room. Implementations also may include receiving the response by an e-mail message, an instant message, or in an on-line chat room. The automatically updated services may include, for example, providing a list of current group members, sharing information in an address book, sharing information in a calendar, providing an online forum for current group members to chat with other group members, sending instant messages from a current group member to other current group members, sharing data files among current group members, sharing a buddy list among current group members, and offering new services to current group members. The shared information may be updated based upon information entered by the current group members. In the shared address book, the information shared may include, for example, a name, an address (either personal or business), an email address, an instant message user identifier, a screen name, and a telephone number. In the shared calendar, the shared information may include, for example, a date, an appointment, an anniversary, a birthday, a holiday, and an invitation for other current group members to attend an event. For the shared data files, implementations may include sharing, for example, digital images such as photographs, text files, or multimedia files.

In another general aspect, a communication system shares information among members of a group through a group administrator which processes information about current group members, a group communicator that delivers and exchanges information with both current and prospective group members, and a group information updater that provides automatically updated services to current group members.

Implementations may include, for example, a group administrator that has a group member profile server to update information about the group members and a database to store data about the group members. Implementations also may include, for example, a group communicator that has an instant message host complex and a login server to communicate with a client system and determine whether the client is authorized to access the instant message host complex. The instant message host complex may include an instant message server to send and receive data, a domain server to provide supporting functions, and a routing gateway.

A group communicator also may have an OSP host complex and login server to communicate with a client system and determine whether the client is authorized to access the OSP host complex. The OSP host complex may include an OSP server to send and receive data.

The group information updater may have a user interface to communicate and exchange data with group members, receive updated information from the user interface, and automatically provide updated services to group members. The user interface may reside, for example, on an instant message complex, an OSP host complex, or on the Internet.

In another general aspect, a graphical user interface (UI) may be used to invite prospective members to join the group. The UI may include an invitation message, the group name, a list of current group members, and a tool that allows the prospective member to respond to the invitation.

These and other general aspects may be implemented by an apparatus and/or by a computer program stored on a computer readable medium. The computer readable medium may comprise a disc, a client device, a host device, and/or a propagated signal.

Other features and advantages will be apparent from the following description, including the drawings, and from the claims.

DETAILED DESCRIPTION

For illustrative purposes, FIGS. 1-5 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
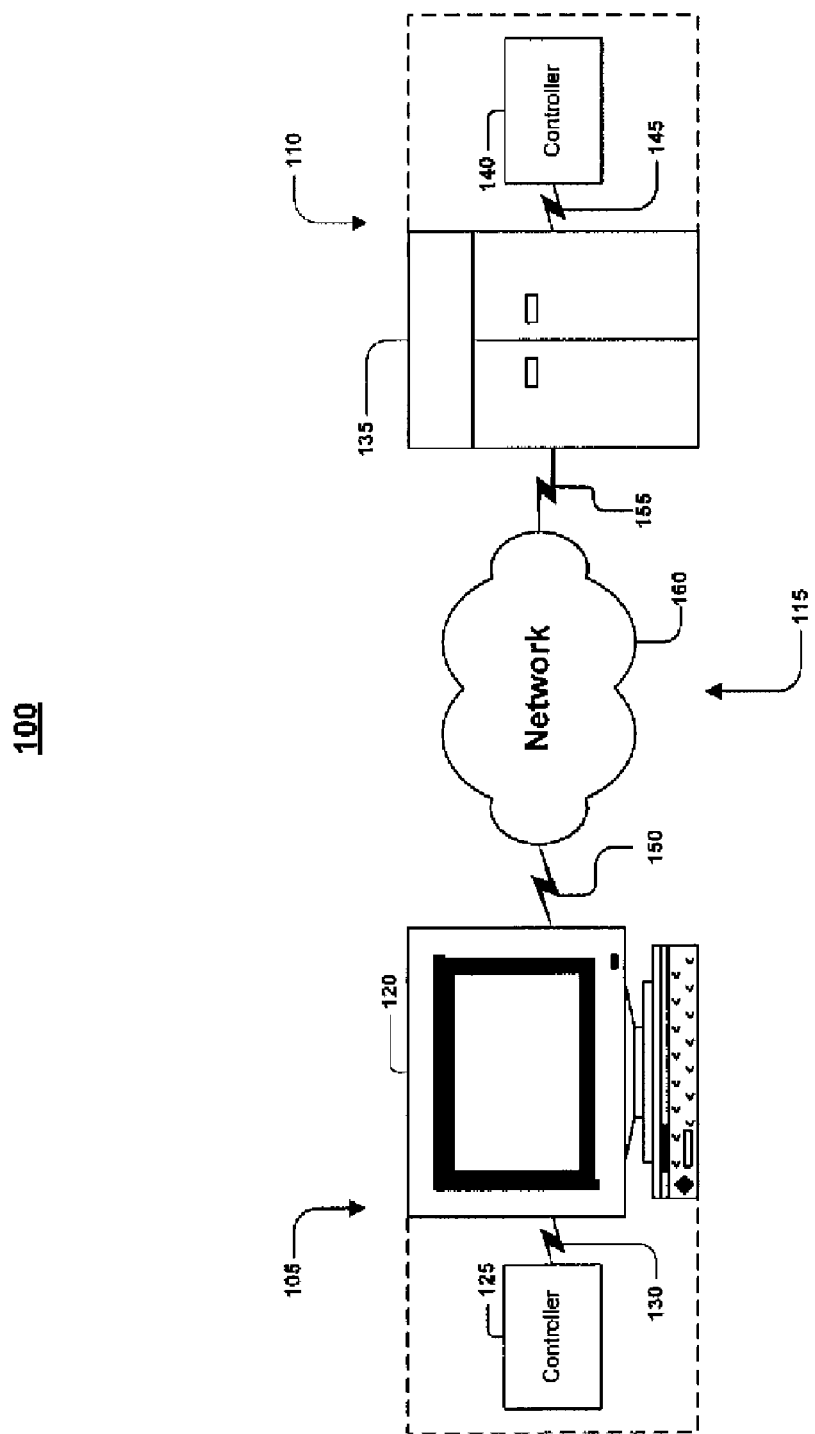
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

In general, the client device 120 is capable of executing instructions under the command of a client controller 125. The client device 120 is connected to the client controller 125 by a wired or wireless data pathway 130 capable of delivering data.

The client device 120 and the client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment, or some combination of these elements that is capable of responding to and executing instructions. An example of a client controller 125 is a software application loaded on the client device 120 for commanding and directing communications enabled by the client device 120. Other examples include a program, a piece of code, an instruction, a device, a computer, a computer system, or a combination of these elements that is capable of independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and the host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment, or some combination of these elements that is capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination of these elements that is capable of independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
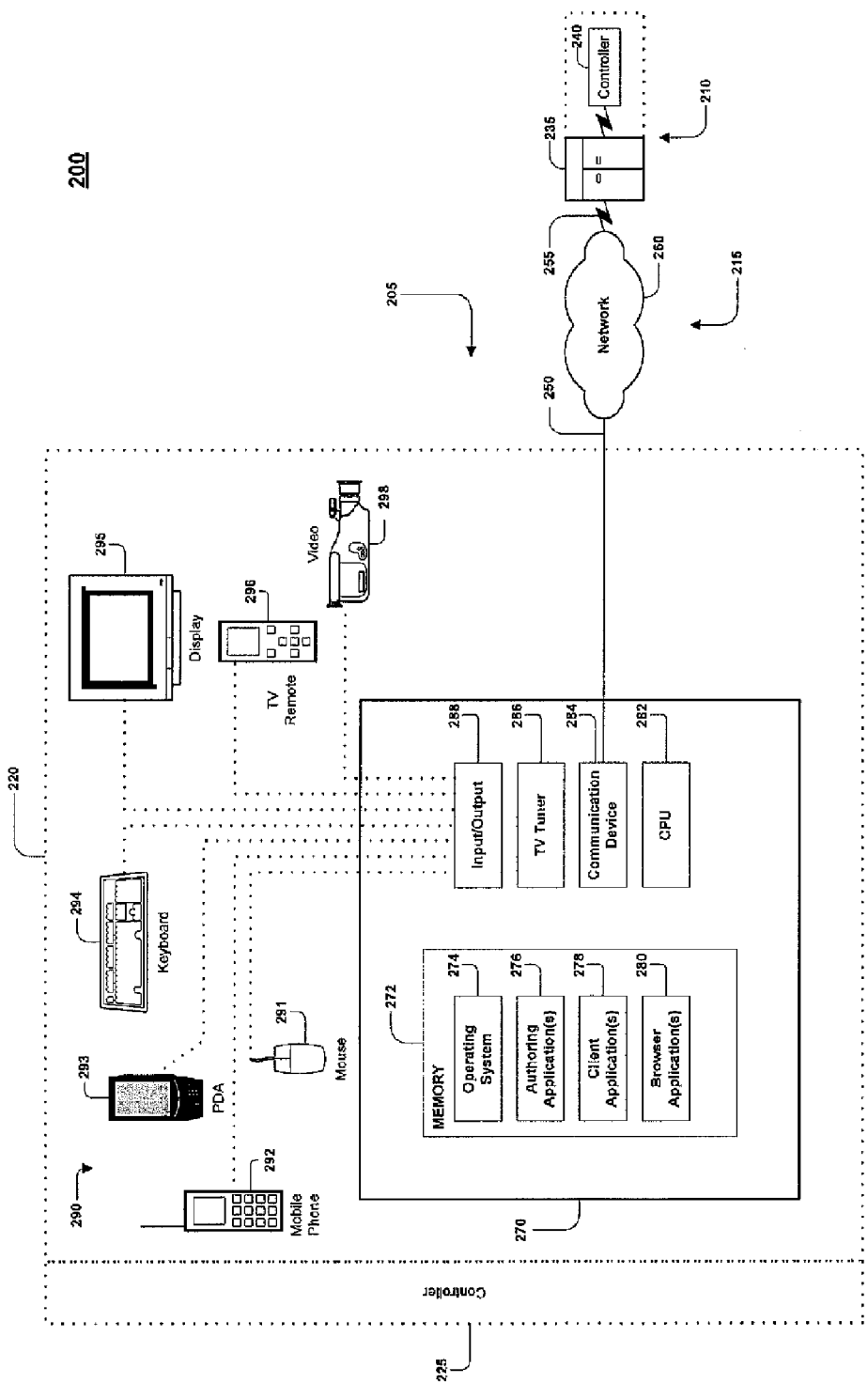
FIGS. 2-5 are expansions of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to the client system 105 of FIG. 1 and illustrates one possible implementation of that system.

The client device 220 typically includes a general purpose computer 270 having an internal or external storage 272 for storing data and programs such as an operating system 274

(e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or an ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and a video input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
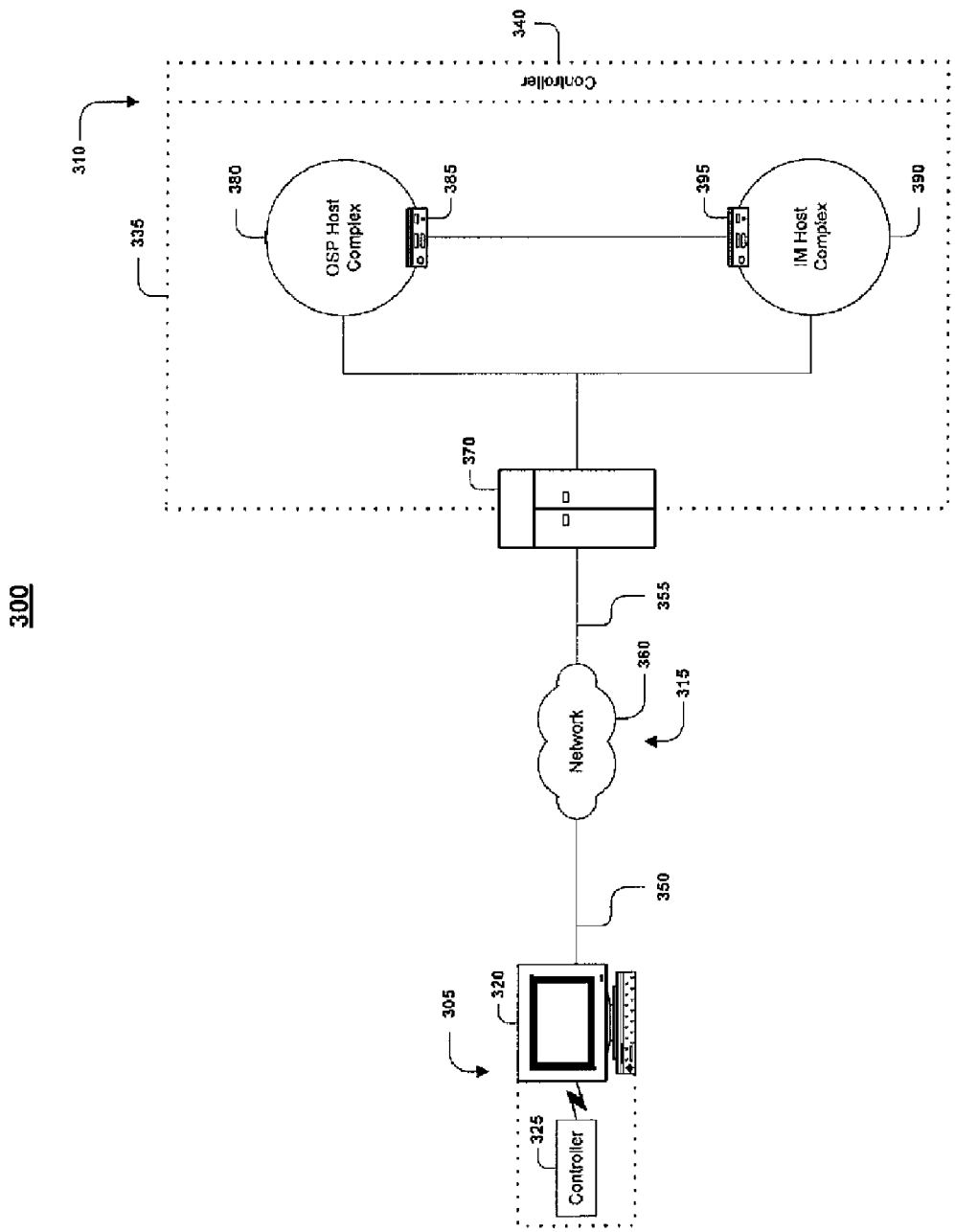

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to the host systems 110 and 210 shown in FIGS. 1 and 2, respectively and illustrates one possible implementation of those systems.

The host system 310 includes a host device 335 and a host controller 340. In general, the host controller 340 is capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, such as for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

In general, the IM host complex 390 is independent of the OSP host complex 380 and supports instant messaging services irrespective of a subscriber's network or Internet access. Thus, the IM host complex 390 allows subscribers to send and receive instant messages, regardless of whether they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
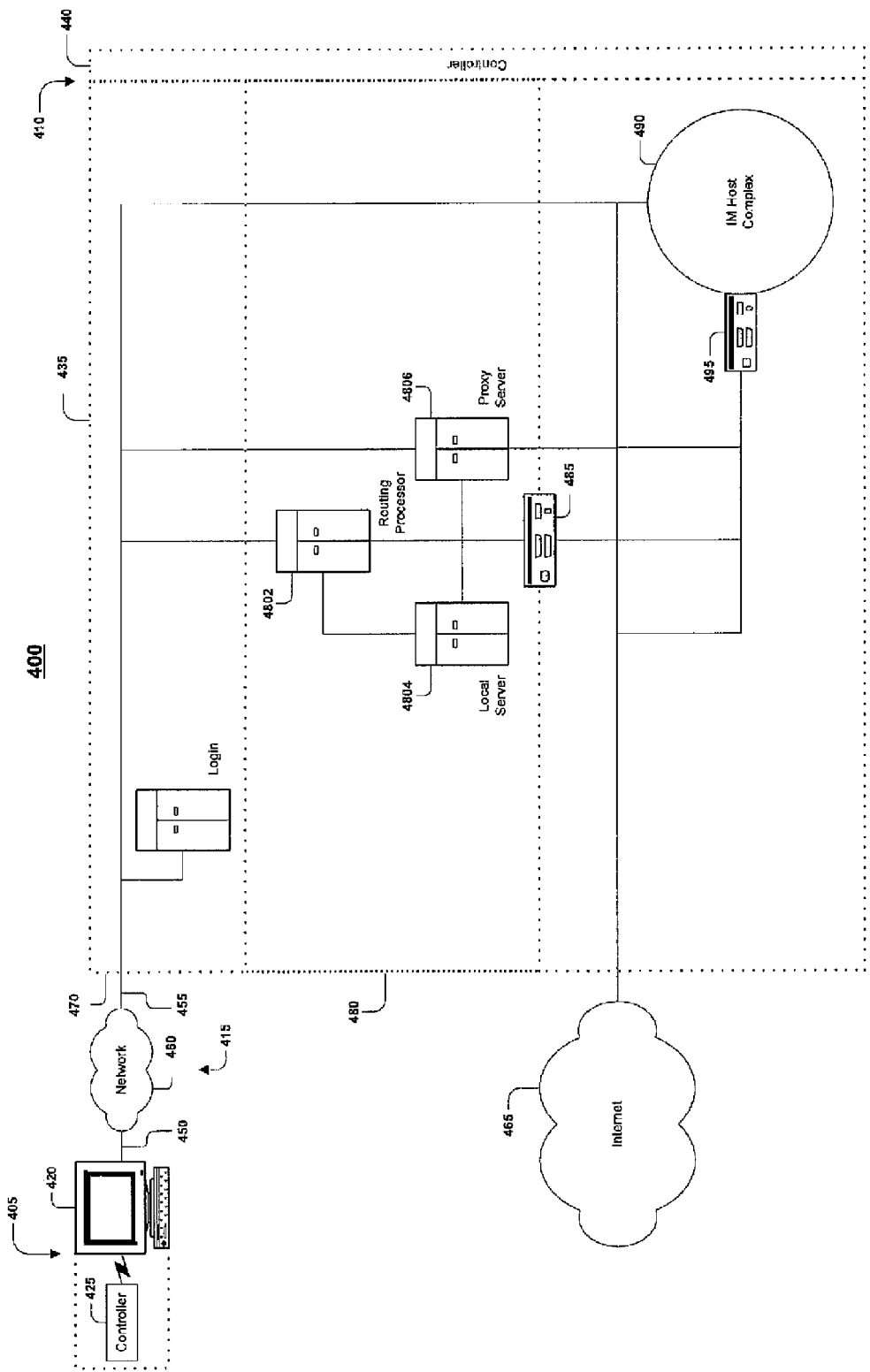

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to the host systems 110, 210, and 310 and illustrates one possible implementation of those systems. FIG. 4 describes an aspect of the host system 410, focusing primarily on one particular implementation of OSP host complex 480. In general, for purposes of communicating with an OSP host complex 480, the delivery network 460 is a telephone network.

The client system 405 includes a client device 420 and a client controller 425. The client controller 425 is capable of establishing a connection to the host system 410, including the OSP host complex 480, the IM host complex 490 and/or the Internet 465. In one implementation, the client controller 425 includes an OSP application for communicating with sewers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login sewer 470 may implement one or more authorization procedures to enable simultaneous access to the OSP host complex 480 and the IM host complex 490. The OSP host complex 480 and the IM host complex 490 are connected through one or more OSP host complex gateways 485 and one or more al host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4802 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental control settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
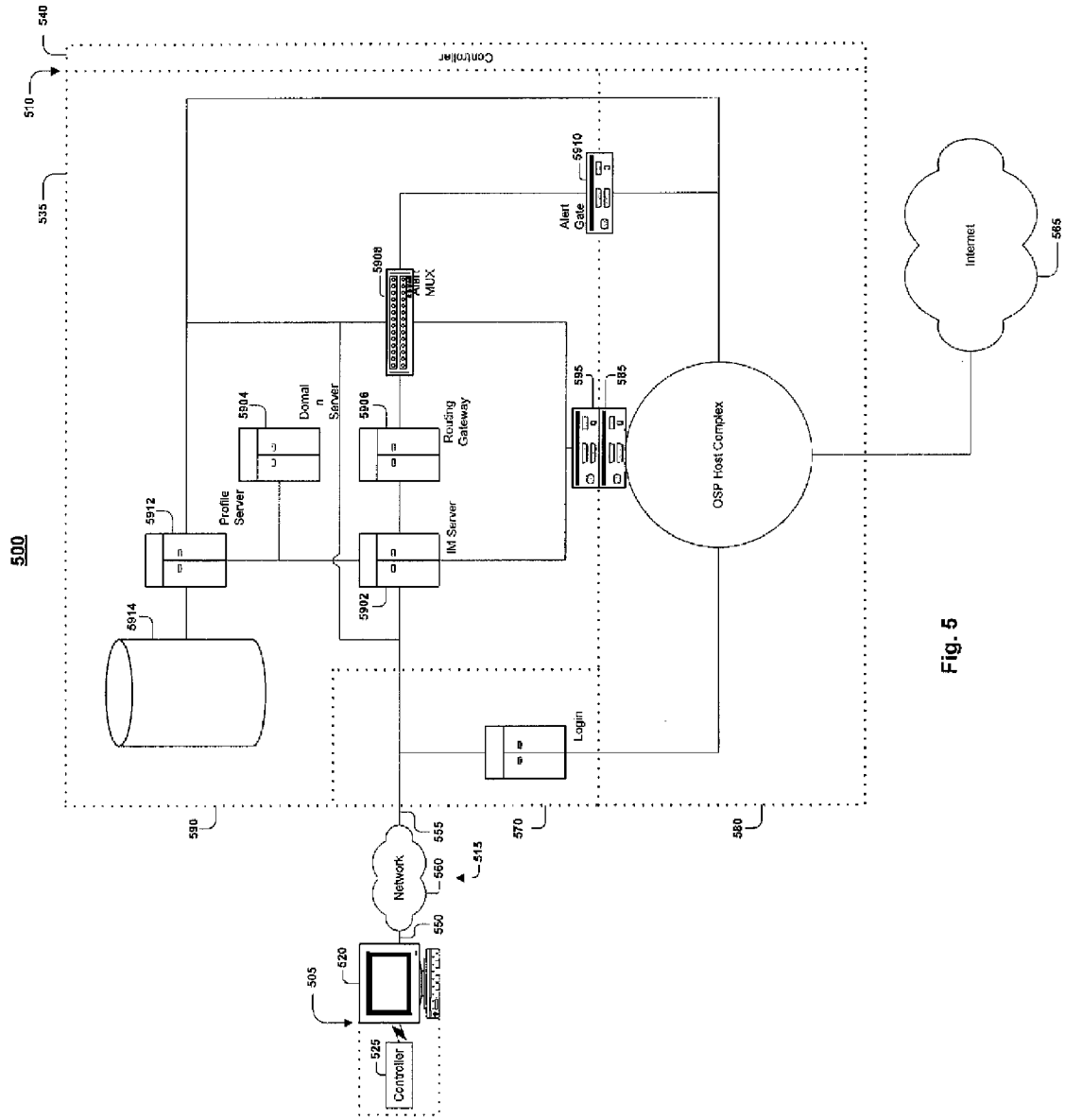

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to the host systems 110, 210, 310, and 410 shown in FIGS. 1-4, and illustrates one possible implementation of those systems. However, FIG. 5 describes an aspect of the host system 510, focusing primarily on one particular implementation of IM host complex 590. In general for purposes of communicating with the IM host complex 590, the delivery network 560 is a telephone network.

The client system 505 includes a client device 520 and a client controller 525. The client controller 525 is capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data include, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data are stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
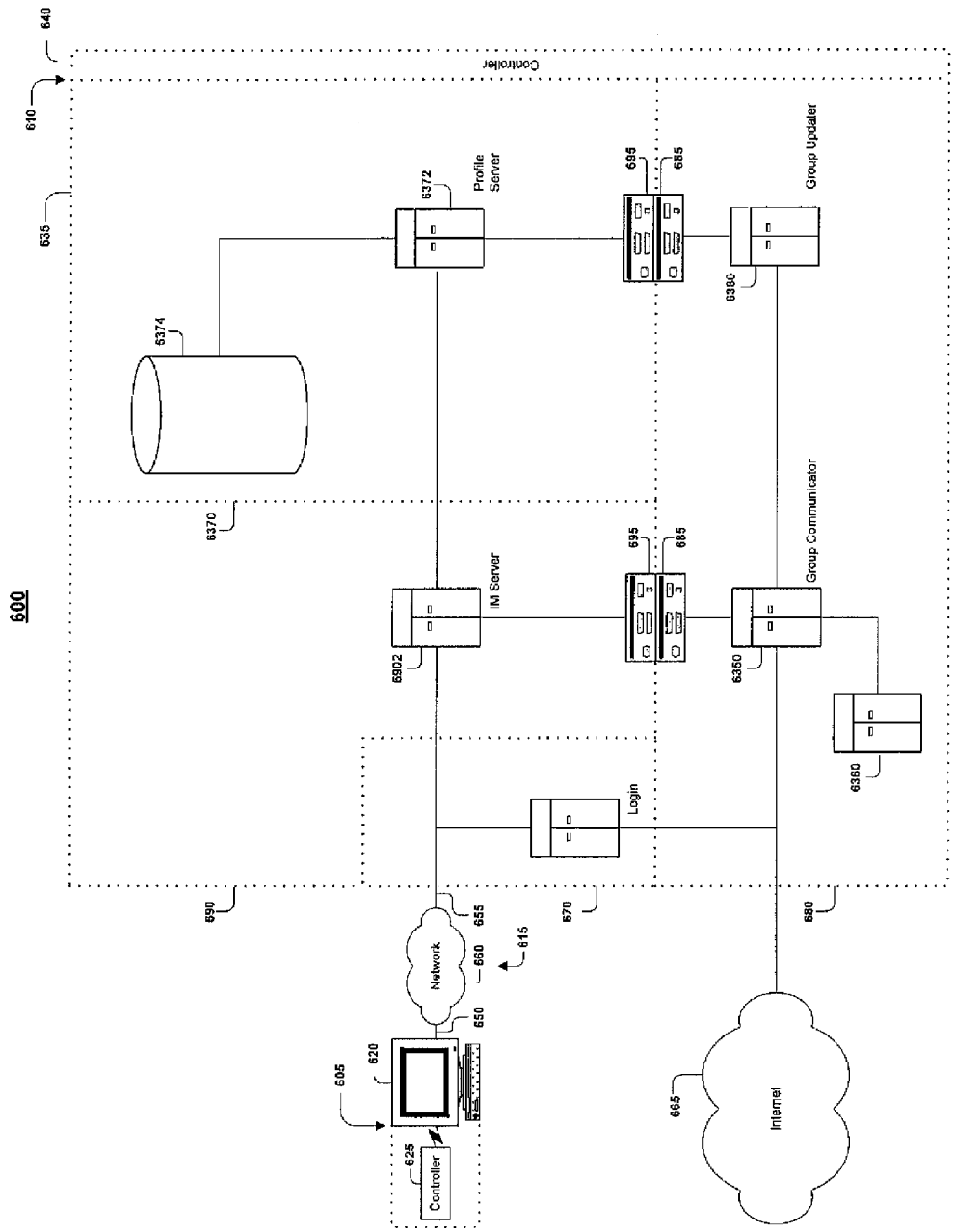
FIG. 6 is a block diagram of a communications system.

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link 615 may include one or more delivery networks 660. A network 660 may be any known or described delivery network including, but not limited to, a telephone network and/or the Internet. The communications system 600 may be implemented as part of the communications system described above with reference to FIGS. 1-5.

Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5. Likewise, the host system 610 of FIG. 6 may have attributes comparable to the host systems 110, 210, 310, 410, and 510 shown in FIGS. 1-5 and may illustrate one possible implementation of those systems. However, FIG. 6 describes an aspect of the host system, focusing primarily on one particular implementation of the host device 635.

The host system 610 includes a host device 635 and a host controller 640. The host controller 640 is capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host system 610 includes a login server 670 capable of enabling communications with and authorizing access by client systems 605 to various elements of the host system 610, including an OSP host complex 680 and an IM host complex 690. The login server 670 may implement one or more authorization procedures to enable simultaneous access to the OSP host complex 680 and the IM host complex 690. The OSP host complex 680 and the IM host complex 690 are connected through one or more OSP host complex gateways 685 and one or more IM host complex gateways 695. Each OSP host complex gateway 685 and IM host complex gateway 695 may perform any protocol conversions necessary to enable communication between the OSP host complex 680, the IM host complex 690, and the Internet 665.

In one implementation, the host system 635 includes one or more group administrators 6370 in communication with one or more group communicators 6350. The group communicators 6350 are further in communication with one or more group information updaters 6380. Each group may have dedicated servers maintained locally on a particular host complex or at a centralized location. As shown, the group communicator 6350 and the group information updater 6380 exist on the OSP host complex 680 and the group administrator 6370 exists on the IM host complex 690. Other configurations, however, may be used in alternative implementations. For example, the functionality of the group administrator 6370, the group communicator 6350, and the group information updater 6380 may reside on a single server or be distributed among multiple servers.

The group communicator 6350 cooperates with the group administrator 6370 and the group information updater 6380 and is configured to deliver and exchange information with current and prospective members of the group. In particular, the group communicator 6350 is configured to process invitations from current members of the group to prospective members. Any of the current group members, as reflected in the group administrator's records, may use the group communicator 6350 to initiate or receive messages from a current or a prospective group member. The group communicator 6350 may send and receive messages from current and prospective group members through an IM server 6902, the Internet 665, and/or other communications server 6360 (e.g., e-mail server, chat sever, OSP buddy server). Typically, the group information updater 6350 will include a user interface configured to interact with client devices of group members and facilitate information exchange. The user interface may, for example, allow group members to select and input information (e.g., new group, screen names of invited members) to the group communicator 6350 and allow entered information (e.g., group membership, screen names of group members) to be extracted by the group communicator 6350.

In one implementation, the group communicator 6350 communicates with an IM server 6902, the Internet 665, and/or other communications server 6360. The group communicator 6350 is configured to permit access to various groups, and to route communications of group members to the correct servers for delivery to prospective members. The login sewer 670 may assist the group communicator 6350 with authorizing access to the various groups.

The group administrator 6370 is configured to keep track of information about current group members and to provide automatically updated services to current group members. In one implementation, the group administrator 6370 includes a group member profile sever 6372 configured to enter, update, retrieve, store, edit, manipulate, or otherwise process information about the current members of a group and a database 6374 for storing information associated with group members. The group administrator 6370 may be configured to gather and track information about the online status of and services provided to current group members. In one implementation, the group administrator 6370 communicates with an IM server 6902 that monitors the online status and capabilities of group members. The group administrator 6370 also may, for example, communicate with the OSP Host Complex 680 or the Internet 665 to gather and track such information.

The group information updater 6380 cooperates with the group communicator 6350 and the group administrator 6370 and is configured to perform all necessary processing to keep the information about the current group members up to date. In one implementation, the group information updater 6380 is configured to instruct the group administrator 6370 to update information associated with group members.

Figure 7:
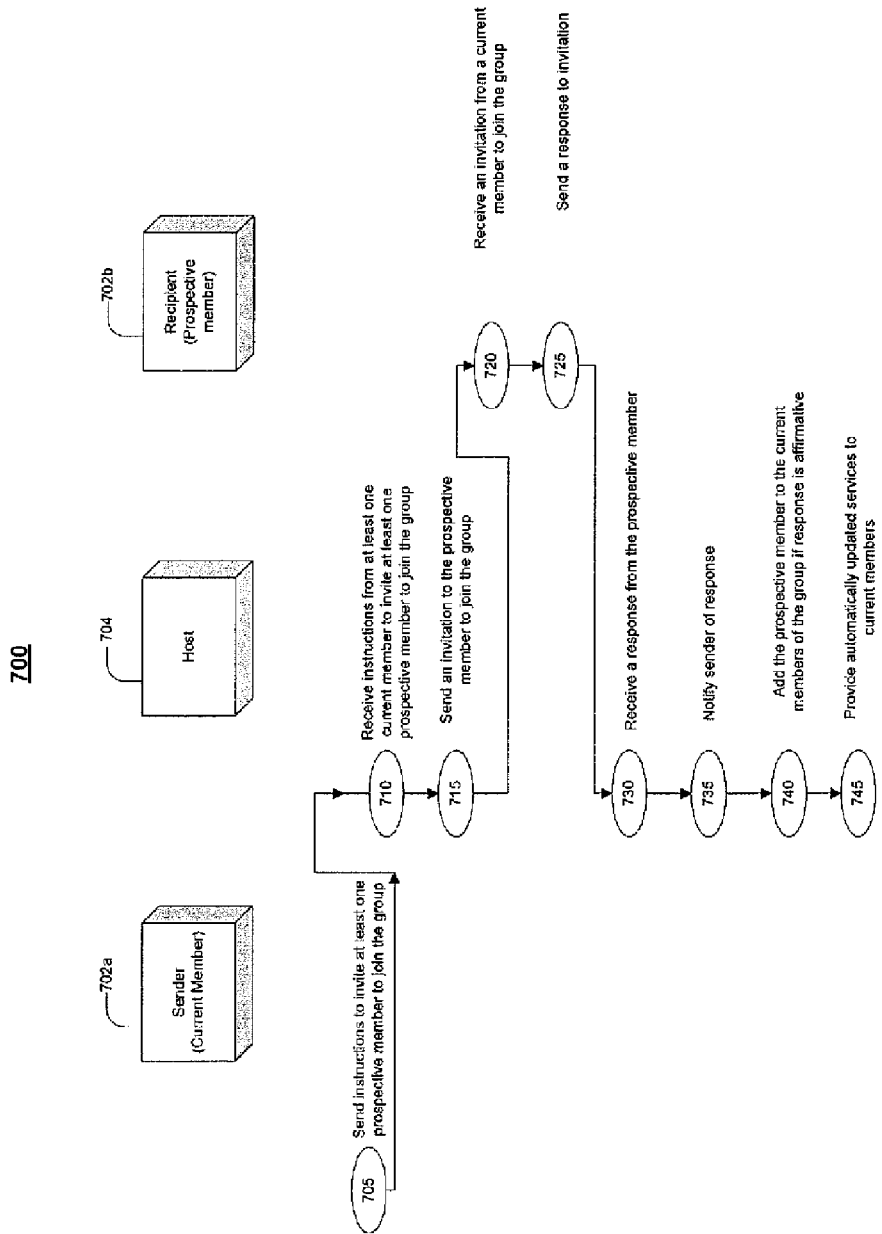
FIG. 7 is a diagram of a communications method implemented by the system of FIG. 6.

Referring to FIG. 7, a current member 702a, a prospective member 702b, and a host 704 interact according to a procedure 700 to share information among members of a group. The current member 702a and the prospective member 702b are each associated with a user and typically have attributes comparable to those described above with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640 in host systems 110, 210, 310, 410, 510, and 610. The host 704 may be directly or indirectly interconnected to the client 702a and the client 702h through a known or described delivery network. The procedure 700 may be implemented by any type of hardware, software, device, computer, computer system, equipment, component, application, code, storage medium, or propagated signal.

There may be several different levels and types of groups. Examples of groups include, but are not limited to, family, friends, co-workers, classmates, teammates, affiliates, and the like. Subscribers may create and join several different groups. The group feature may be associated with and/or provided by different host complexes (e.g., Groups@AOL, Groups@CompuServe) and/or different web pages (e.g., Groups@Netscape.com, Groups@CNN.com).

A group typically will be made up of a subset of the subscribers to the host 704, but may include members who are not subscribers to the host 704. To participate in a group, a subscriber must either create a new group and invite others to join, or enter a group to which the subscriber has been invited. In one implementation, when a subscriber creates a group, the subscriber is considered the "founder" of the group. As the founder, the subscriber has the ability to remove members and delete content. Any member can leave a group at any time after joining, but only the founder of a group can delete a group. When a founder leaves the group, the group must also be deleted. Alternatively, any group member may be provided with the same capabilities as the founder, including the ability to remove members, delete content and delete the group.

The founder can designate other group members to manage the group as "owners" of the group. A group owner is allowed to change settings (e.g., homepage group title or description) for the entire group, delete and edit group and other member's content, invite prospective members, change member/owner status of any other member, send administrative e-mails as an owner, and even remove troublesome members. Group owners are notified when there is an issue with member e-mail. If there are repeated delivery difficulties or excessive unsolicited bulk mail—an indication of possible mail list abuse—a member may be temporarily suspended from participating in the group mail list. The group owner may opt to resume delivery, remove the member from the group or resolve the issue later.

To create a group, a subscriber enters attributes of the group to the host 704 through a user interface displayed on a client device. The group attributes may include, but are not limited to, a unique group name, a description of the group, a time zone so that events are properly timed, a group theme (e.g., Family, Friends, Activity Group), and a design style having a certain color schemes images that represent members. The subscriber also may create a personal profile and make it available to other group members. The personal profile may include information such as name, e-mail address, mailing address, phone numbers, birthday (which shows up automatically in an events area), an image (e.g., photo, icon), a home page, and/or other personal information (e.g., quotes, messages).

Once the subscriber has created the group, the subscriber is considered the founder, an owner, and a member of the group. In one implementation described in more detail below, any member of the group can extend an invitation to a prospective member. In other implementations, however, the ability to invite prospective members may be limited only to founders and/or owners of the group.

Referring again to FIGS. 6 and 7, a current member 702a sends to the host 704 an instruction to invite at least one prospective member 702b to join the group (step 705). In one implementation, the current member 702a presents a user interface to a subscriber for inputting a screen name or e-mail address associated with the prospective member 702b. In another implementation, the current member 702a sends an invitation when the right button of a computer mouse is clicked while pointing to a screen name associated with a prospective member 702b. The right click causes a menu of choices to appear. When an option from the menu to send an e-mail message inviting the prospective member 702b to join the group is selected, the current member 702a automatically generates the invitation.

The host 704 receives the instruction to invite the prospective member 702b (step 710) and in response sends an invitation to the prospective member 702b to join the group (step 715). The invitation may be sent as, for example, an e-mail message, an instant message, a post in an online chat room, or by other suitable communication. In one implementation, the group communicator 6350 receives the instruction and sends the invitation through at least one of the IM server 6902, the Internet 665, and/or other communications server 6360 (e.g., e-mail server, chat sever, OSP buddy server).

The prospective member 702b receives the invitation to join the group (step 720) and sends to the host 704 a response to the invitation (step 725). In one implementation, the invitation includes a hyperlink to facilitate joining the group, a personal welcoming message, and/or a list of current group members. When the hyper-link contained in the invitation is clicked, the prospective member 720b sends an affirmative confirmation message indicating the prospective member's desire to join the group and links to the group web site. The response may be sent as, for example, an e-mail message, an instant message, a post in an on-line chat room, or other suitable communication. The response may be affirmative, indicating the prospective member's desire to join the group, or the response may be negative, indicating the prospective member's desire not to join the group. If no response is sent, the lack of a response may be deemed to be a negative response after an appropriate length of time has passed. Alternatively, the lack of a response may be deemed to be a positive response after an appropriate length of time has passed.

The host 704 receives the response from the prospective member 702b (step 730) and notifies the sender of the response (step 735). In one implementation, the group communicator 6350 receives and notes the response to the invitation from the prospective member 702b. The group communicator 6350 then sends a notification to the current member based on the response. If the response from the prospective member is negative, the group communicator 6350 informs the current member that the prospective member 702b has declined the invitation. If, on the other hand, the response from the prospective member 702b is affirmative (i.e., the invitation is accepted), the host 704 adds the prospective member 702b to the group (step 740) and provides automatically updated services to current members of the group (step 745).

The automatically updated services provided to current members of the group by the host 704 include, but are not limited to, providing a private group website, a list of current group members, a shared buddy list, a shared address book, shared member profiles, a shared calendar, a shared map, a shared message board, a private on-line forum for current group members to chat with one another, a shared list of favorite sites, a shared photo gallery, and/or any other type of shared data files. New automatically updated services based upon the current group members may be offered. For example, enhanced services based on the equipment capabilities of the group members may be offered when at least some group members upgrade hardware and/or software.

The private group website is accessible only to members. Typically, each member will be prompted for the group name and a password to enter. The group website may have text, images, audio, and video information related to the group and also may include hyper-links to other areas and services of interest to group members. A list of current group members may be displayed on the website or accessed by a hyperlink. The list also may indicate the online status of each group member, note the last time a particular member visited the site, and include short cut ways to communicate with group members (e.g., right click to e-mail or instant message).

In addition to other elements, the shared buddy list includes, the screen names of group members to facilitate instant messaging communication. In general, a subscriber's buddy list is a user interface that lists the online status and capabilities of certain screen names, i.e., "buddies," identified by the subscriber. In particular, the buddy list interfaces with the host 704 to identify which buddies are online, i.e., currently accessing the host 704. The buddy list also facilitates instant messaging communication between subscribers. A subscriber can activate an instant messaging message window pre-addressed to a buddy simply by clicking the screen name of a buddy on the buddy list. Otherwise, the subscriber must activate and address a blank instant messaging window. When necessary, a subscriber can look up the screen name of an intended recipient using the intended recipient's e-mail address or other identifying information.

The shared address book may contain information about group members including, but not limited to, names, addresses (e.g., residential or business), e-mail addresses, instant messaging screen names, telephone numbers, comments, home page address, and/or any other personal information. The shared personal profile of a group member may include only that personal information desired by the member to be shared with the group or the Internet community at large.

The shared calendar may contain information about group members including, but not limited to, events, appointments, anniversaries, birthdays, holidays, and/or any other designated date. Group members may receive invitations and/or reminders about important dates (e.g. an invitation to attend an event).

The shared map may contain information including, but not limited to, home and work locations of members, the current locations of members, a meeting place, an event location, or any other designated area. Driving directions to and from locations also may be provided.

The shared message board provides a way for group members to post thoughts, messages, and/or comments for subsequent viewers. After a post is made, the group member may be prompted to e-mail or instant message the post to some or all group members. The private on-line forum allows group members to chat with one another. Group members may view who is in the chat room, invite absent members to attend the chat session, coordinate a time to visit the chat room, and/or engage in a spontaneous chat session with some or all other members visiting the group website.

The shared list of favorite sites may include, but is not limited to, group related websites, favorite websites of members, and/or any other Internet site. Group members also may post recommendations and/or opinions about certain links to web sites, music, books, movies, and the like. The shared photo gallery may include individual photographs or albums of photographs online. Group members may download and/or order prints of the images. Current members also may share data files of any other type including, but not limited to, text files, audio files, image files, video files, and/or multi-media files.

The shared information associated with the automatically updated services is stored on the host system 610. In one implementation, the host system 610 includes a group administrator 6370 having a group member profile server 6372 and a database 6374 for storing information associated with group members. The group member profile server 6372 enters, updates, retrieves, store, edits, manipulates, or otherwise processes information stored in the database 6374. The shared information associated with the automatically updated services may be stored in the database 6374 by group and/or by individual subscriber. For example, information associated with a particular subscriber may include, but is not limited to, a personal profile, a buddy list, an address book, a calendar, a list of favorite sites, group memberships, and/or any other user preference.

The information associated with the automatically updated services typically will be provided to current members based upon information entered by at least one current member of the group. Group information, however, may be entered or supplemented by a person or a system outside of the group.

In one implementation, upon receiving an affirmative response from the prospective member 702b, the group communicator 6350 instructs the group information updater 6380 to add the prospective member to the group. The group information updater 6380 updates the list of current members and adds the prospective member to the current members of the group. The group information updater 6380 then communicates the addition of the prospective member to the group administrator 6370 and instructs the group administrator to update the group member information. In one implementation, the group information updater 6380 communicates with the group administrator 6370 through gateways 685, 695.

The group administrator 6370 receives the notification and instruction regarding the updated group membership and in response updates the information associated with members of the group. In one implementation, the group member profile server 6372 accesses the information stored in the database 6374 and populates the storage space associated with the members of the group with updated information. For example, a buddy list associated with a current group member 702*b* will be populated with the screen names of all the current members of the group, including the screen names of the prospective members that have accepted an invitation. The buddy list of a group member is updated by adding screen names of new members and deleting screen names of former members. During an instant messaging session, the group member is in constant communication with the IM server 6902. The IM server, in turn, is in constant communication with the group member profile server 6372 and automatically updates the group members buddy list when a change to a group is made.

Figure 8:
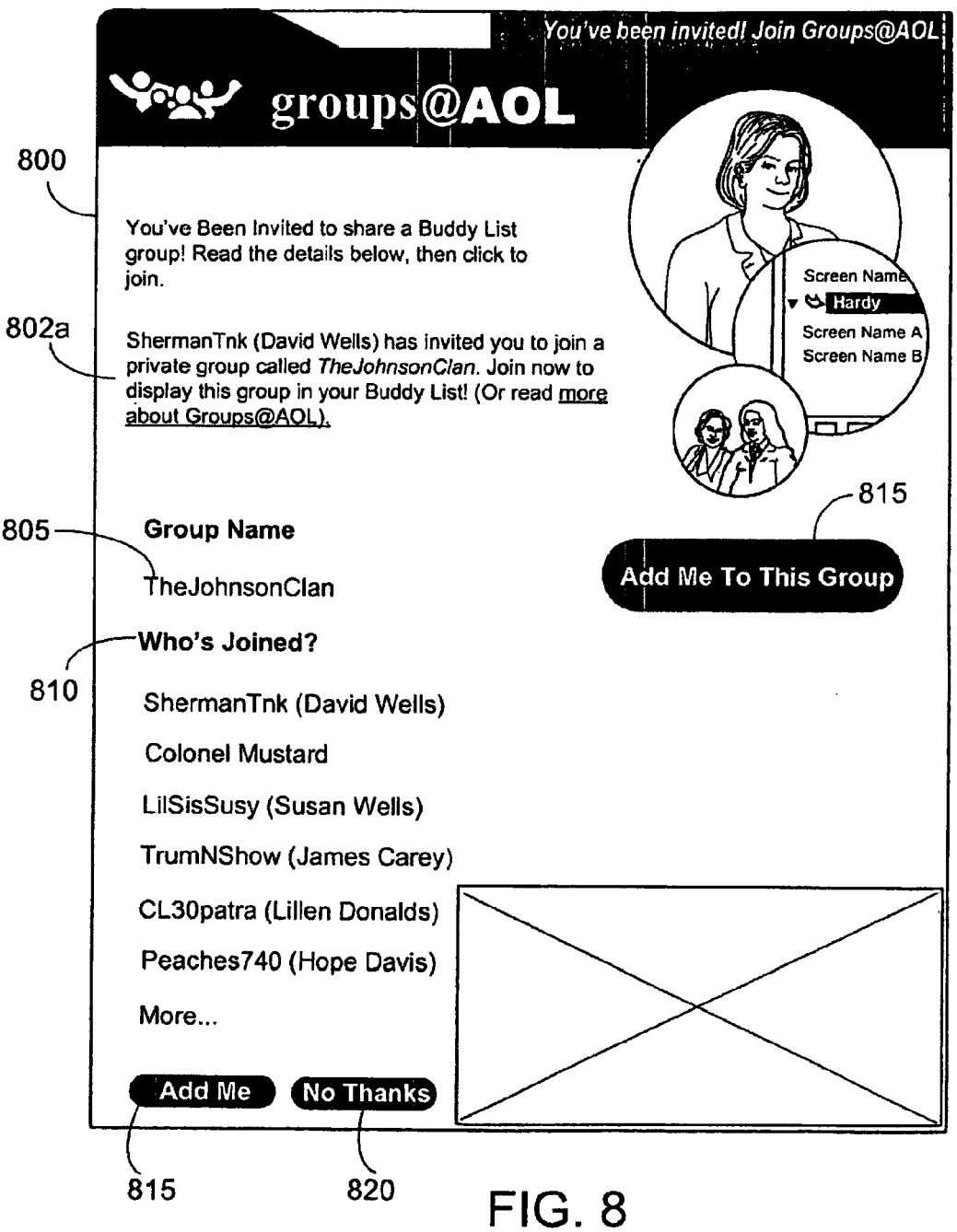
FIG. 8 is a screen shot of a user interface of the system of FIG. 6.

As shown in FIG. 8, a UI 800 illustrates an example of how the prospective member 702*b* may be invited to join a Buddy List group by a current member 702*a*. The UI 800 presented to the prospective member 702*b* includes the name of the group 805 and the current members of the group 810. The UT 800 provides buttons or other suitable graphical tools to allow the prospective member 702*b* to accept the invitation 815 or to reject the invitation 820. As an alternative to a button, a hyperlink, a pull-down menu, a popup menu, or another graphical tool may be used to allow the prospective member 702*b* to respond to the invitation.

Other embodiments are within the scope of the following claims.

What is claimed is:

1. A computer-implemented method comprising:
maintaining, in a storage device, a group of instant messaging participants that has a membership that includes at least one instant messaging participant selected for inclusion in the group by a founding instant messaging identity, the group being founded by the founding instant messaging identity;
enabling, with at least one processor, a display of an instant messaging participant list that reflects online profile information for other instant messaging identities included in the instant messaging participant list and enables the founding instant messaging identity to initiate instant messaging sessions with the other instant messaging identities included in the instant messaging participant list, the displayed instant messaging participant list including a representation of the group of instant messaging participants that reflects the membership of the group of instant messaging participants;
in response to the founding instant messaging identity adding a new member to the membership of the group of instant messaging participants, automatically adding a representation of the new member to the displayed representation of the group of instant messaging participants on the displayed instant messaging participant list; and
enabling members of the group of instant messaging participants to initiate instant messaging sessions with the other instant messaging identities, including the new member, included in the group of instant messaging participants;
wherein the founding instant messaging identity is the only member authorized to add members to or delete members from the group of instant messaging participants.

2. The method of claim 1, further comprising:
in response to receiving a request to invite a new instant messaging participant to join the group of instant messaging participants, transmitting an electronic invitation to join the group of instant messaging participants to the new instant messaging participant;
receiving, from the new instant messaging participant, an indication of an acceptance of the invitation to join the group of instant messaging participants; and
in response to receiving the indication of the acceptance of the invitation to join the group of instant messaging participants, adding the new instant messaging participant to the group of instant messaging participants.

3. The method of claim 1, further comprising:
in response to receiving a request to invite a new instant messaging participant to join the group of instant messaging participants from a member of the group of instant messaging participants, determining if the member of the group of instant messaging participants is authorized to invite instant messaging participants to join the group of instant messaging participants; and
transmitting an electronic invitation to join the group of instant messaging participants to the new instant messaging participant only after determining that the member of the group of instant messaging participants is authorized to invite instant messaging participants to join the group of instant messaging participants.

4. The method of claim 3, wherein the electronic invitation is transmitted in the form of a hyperlink displayed within an email or a web-based interface.

5. The method of claim 3, further comprising:
in response to receiving a request to remove an existing instant messaging participant from a member of the group of instant messaging participants, removing the existing instant messaging participant from the group of instant messaging participants, wherein: determining that an existing member has been removed from the group of instant messaging participants includes determining that the existing instant messaging participant has been removed from the group of instant messaging participants, and
automatically deleting a displayed representation of the existing member from the representation of the group of instant messaging participants on the displayed instant messaging participant list includes automatically deleting a displayed representation of the existing instant messaging participant from the representation of the group of instant messaging participants on the displayed instant messaging participant list.

6. The method of claim 5 further comprising:
determining if the member of the group of instant messaging participants is authorized to remove instant messaging participants from the group of instant messaging participants,
wherein removing the existing instant messaging participant from the group of instant messaging participants includes removing the existing instant messaging participant from the group of instant messaging participants only after determining that the member of the group of instant messaging participants is authorized to remove instant messaging participants from the group of instant messaging participants.

7. A system comprising:
a processing device; and
a memory storage device that stores instructions that, when executed by the processing device, cause the processing device to:
maintain a group of instant messaging participants that has a membership that includes at least one instant messaging participant selected for inclusion in the group by a founding instant messaging identity, the group being founded by the founding instant messaging identity;
enable a display of an instant messaging participant list that reflects online profile information for other instant messaging identities included in the instant messaging participant list and enables the founding instant messaging identity to initiate instant messaging sessions with the other instant messaging identities included in the instant messaging participant list, the displayed instant messaging participant list including a representation of the group of instant messaging participants that reflects the membership of the group of instant messaging participants;
in response to the founding instant messaging identity adding a new member to the membership of the group of instant messaging participants, automatically add a representation of the new member to the displayed representation of the group of instant messaging participants on the displayed instant messaging participant list; and
enable members of the group of instant messaging participants to initiate instant messaging sessions with the other instant messaging identities, including the new member, included in the group of instant messaging participants;
wherein the founding instant messaging identity is the only member authorized to add members to or delete members from the group of instant messaging participants.

8. The system of claim 7, wherein the processing device is further configured to:
in response to receiving a request to invite a new instant messaging participant to join the group of instant messaging participants, transmit an electronic invitation to join the group of instant messaging participants to the new instant messaging participant;
receive, from the new instant messaging participant, an indication of an acceptance of the invitation to join the group of instant messaging participants; and
in response to receiving the indication of the acceptance of the invitation to join the group of instant messaging participants, add the new instant messaging participant to the group of instant messaging participants.

9. The system of claim 7, wherein the processing device is further configured to:
in response to receiving a request to invite a new instant messaging participant to join the group of instant messaging participants from a member of the group of instant messaging participants, determine if the member of the group of instant messaging participants is authorized to invite instant messaging participants to join the group of instant messaging participants; and
transmit an electronic invitation to join the group of instant messaging participants to the new instant messaging participant only after determining that the member of the group of instant messaging participants is authorized to invite instant messaging participants to join the group of instant messaging participants.

10. The system of claim 9, wherein the electronic invitation is transmitted in the form of a hyperlink displayed within an email or a web-based interface.

11. The system of claim 9, wherein the processing device is further configured to:
in response to receiving a request to remove an existing instant messaging participant from a member of the group of instant messaging participants, remove the existing instant messaging participant from the group of instant messaging participants, wherein:
determining that an existing member has been removed from the group of instant messaging participants includes determining that the existing instant messaging participant has been removed from the group of instant messaging participants, and
automatically deleting a displayed representation of the existing member from the representation of the group of instant messaging participants on the displayed instant messaging participant list includes automatically deleting a displayed representation of the existing instant messaging participant from the representation of the group of instant messaging participants on the displayed instant messaging participant list.

12. The system of claim 11, wherein the processing device is further configured to:
determine if the member of the group of instant messaging participants is authorized to remove instant messaging participants from the group of instant messaging participants,
wherein removing the existing instant messaging participant from the group of instant messaging participants includes removing the existing instant messaging participant from the group of instant messaging participants only after determining that the member of the group of instant messaging participants is authorized to remove instant messaging participants from the group of instant messaging participants.

13. A non-transitory computer-readable storage medium storing instructions that, when executed by at least one processor, cause the at least one processor to:
maintain a group of instant messaging participants that has a membership that includes at least one instant messaging participant selected for inclusion in the group by a founding instant messaging identity, the group being founded by the founding instant messaging identity;
enable a display of an instant messaging participant list that reflects online profile information for other instant messaging identities included in the instant messaging participant list and enables the founding instant messaging identity to initiate instant messaging sessions with the other instant messaging identities included in the instant messaging participant list, the displayed instant messaging participant list including a representation of the group of instant messaging participants that reflects the membership of the group of instant messaging participants;
in response to the founding instant messaging identity adding a new member to the membership of the group of instant messaging participants, automatically add a representation of the new member to the displayed representation of the group of instant messaging participants on the displayed instant messaging participant list; and
enable members of the group of instant messaging participants to initiate instant messaging sessions with the other instant messaging identities, including the new member, included in the group of instant messaging participants;

wherein the founding instant messaging identity is the only member authorized to add members to or delete members from the group of instant messaging participants.

14. The non-transitory computer-readable storage medium of claim 13, wherein the at least one processor is further configured to:
- in response to receiving a request to invite a new instant messaging participant to join the group of instant messaging participants, transmit an electronic invitation to join the group of instant messaging participants to the new instant messaging participant;
- receive, from the new instant messaging participant, an indication of an acceptance of the invitation to join the group of instant messaging participants; and
- in response to receiving the indication of the acceptance of the invitation to join the group of instant messaging participants, add the new instant messaging participant to the group of instant messaging participants.

15. The non-transitory computer-readable storage medium of claim 13, wherein the at least one processor is further configured to:
- in response to receiving a request to invite a new instant messaging participant to join the group of instant messaging participants from a member of the group of instant messaging participants, determine if the member of the group of instant messaging participants is authorized to invite instant messaging participants to join the group of instant messaging participants; and
- transmit an electronic invitation to join the group of instant messaging participants to the new instant messaging participant only after determining that the member of the group of instant messaging participants is authorized to invite instant messaging participants to join the group of instant messaging participants.

16. The non-transitory computer-readable storage medium of claim 15, wherein the electronic invitation is transmitted in the form of a hyperlink displayed within an email or a web-based interface.

17. The non-transitory computer-readable storage medium of claim 15, wherein the at least one processor is further configured to:
- in response to receiving a request to remove an existing instant messaging participant from a member of the group of instant messaging participants, remove the existing instant messaging participant from the group of instant messaging participants, wherein:
  - determining that an existing member has been removed from the group of instant messaging participants includes determining that the existing instant messaging participant has been removed from the group of instant messaging participants, and
  - automatically deleting a displayed representation of the existing member from the representation of the group of instant messaging participants on the displayed instant messaging participant list includes automatically deleting a displayed representation of the existing instant messaging participant from the representation of the group of instant messaging participants on the displayed instant messaging participant list.

18. The non-transitory computer-readable storage medium of claim 13, wherein the at least one processor is further configured to:
- determine if the member of the group of instant messaging participants is authorized to remove instant messaging participants from the group of instant messaging participants,
- wherein removing the existing instant messaging participant from the group of instant messaging participants includes removing the existing instant messaging participant from the group of instant messaging participants only after determining that the member of the group of instant messaging participants is authorized to remove instant messaging participants from the group of instant messaging participants.

* * * * *